US008223097B2

(12) United States Patent
Lin et al.

(10) Patent No.: US 8,223,097 B2

(45) Date of Patent: Jul. 17, 2012

(54) PIXEL ARRAY STRUCTURE, FLAT DISPLAY PANEL AND METHOD FOR DRIVING FLAT DISPLAY PANEL THEREOF

(75) Inventors: Jeng-Liang Lin, Taichung (TW); Ken-Ming Chen, Taichung (TW); Chi-Mao Hung, Chiayi (TW)

(73) Assignee: Au Optronics Corporation, Hsinchu (TW)

( * ) Notice: Subject to any disclaimer, the term of this patent is extended or adjusted under 35 U.S.C. 154(b) by 426 days.

(21) Appl. No.: 12/554,920

(22) Filed: Sep. 6, 2009

(65) Prior Publication Data

US 2010/0259512 A1 Oct. 14, 2010

(30) Foreign Application Priority Data

Apr. 14, 2009 (TW) .............................. 98112361 A

(51) Int. Cl.
*G06F 3/038* (2006.01)
*G09G 5/00* (2006.01)

(52) U.S. Cl. ........................................... 345/87; 345/92

(58) Field of Classification Search .................... 345/55, 345/87, 204, 90, 92–93
See application file for complete search history.

(56) References Cited

U.S. PATENT DOCUMENTS

| | | | | |
|---|---|---|---|---|
| 7,420,533 | B2 * | 9/2008 | Yun | 345/96 |
| 2005/0088386 | A1 * | 4/2005 | Kao et al. | 345/87 |
| 2006/0164350 | A1 * | 7/2006 | Kim et al. | 345/87 |
| 2007/0091044 | A1 * | 4/2007 | Park et al. | 345/88 |
| 2008/0129652 | A1 * | 6/2008 | Park | 345/55 |
| 2008/0165111 | A1 | 7/2008 | Pai | |

FOREIGN PATENT DOCUMENTS

CN 101093304 12/2007

OTHER PUBLICATIONS

"1st Office Action of China Counterpart Application", issued on May 14, 2010, p. 1-p. 6.

* cited by examiner

*Primary Examiner* — Chanh Nguyen
*Assistant Examiner* — Kwang-Su Yang
(74) *Attorney, Agent, or Firm* — Jianq Chyun IP Office

(57) ABSTRACT

A pixel array structure, a flat display panel and a method for driving a flat display panel thereof are provided. The structure of the pixel array structure and the flat display panel is the structure of the half source driving (HSD). Therefore, by skillfully arranging the coupled relationship between each pixel and each data line, the pixel array structure provided in the present invention can be driven by the gate driver directly disposed on the substrate of the pixel array. Accordingly, not only the fabrication cost of the flat display panel can be reduced, but the manner of the timing controller controlling the gate driver and source driver can also be reduced.

19 Claims, 5 Drawing Sheets

PIXEL ARRAY STRUCTURE, FLAT DISPLAY PANEL AND METHOD FOR DRIVING FLAT DISPLAY PANEL THEREOF

CROSS-REFERENCE TO RELATED APPLICATION

This application claims the priority benefit of Taiwan application serial no. 98112361, filed on Apr. 14, 2009. The entirety of the above-mentioned patent application is hereby incorporated by reference herein and made a part of specification.

BACKGROUND OF THE INVENTION

1. Field of the Invention

The present invention relates to a flat display panel technology, and more particularly, to a pixel array structure and a method for driving a flat display panel thereof.

2. Description of Related Art

In the presence of all structures of the flat display panel, one species is so-called the half source driving (hereinafter "HSD") structure. The HSD structure would reduce the number of the data lines to half by increasing the number of the scan lines to double. Since the number of the data lines is reduced to half, the fabricating cost of the source driver would be relatively reduced.

FIG. 1 illustrates a partial schematic view of a flat display panel 100 of a conventional HSD structure. FIG. 2 illustrates a partial driving time chart of the flat display panel 100 applying a panel driving technique of two line two dot inversion. Referring to FIG. 1 and FIG. 2 simultaneously, the flat display panel 100 has a plurality of pixels Pix arranged in an array. The pixels Pix which are marked with notations R1, G1, B1, R2, G2, B2 are located within a display area AA of the flat display panel 100. On the other hand, the pixels Pix that are not marked with the notations R1, G1, B1, R2, G2, B2 are dummy pixels and located in the periphery of the display area AA.

Moreover, notations S1~S4 are data lines; a notation Sdum is a dummy data line; notations G1~G9 are scan lines; and a notation Gdum is a dummy scan line. The driving time chart disclosed in FIG. 2 includes control signals LD, POL, STVD, OE1~OE3 and a timing signal CLK provided by a timing controller, and a display data SD provided by a source driver. Here, the control signals LD and POL are configured to control the source driver and the control signals STVD and OE1~OE3 are configured to control a gate driver.

It is shown in FIG. 2 that the timing controller must provide the control signals STVD and OE1~OE3 which lead to more complicated operations, so that the gate driver manufactured on a Y-board (not shown) transmits scan signals SS respectively to the scan lines G1~G9. Moreover, by providing corresponding control signals LD and POL, the source driver manufactured on an X-board (not shown) can follow dashed arrows in FIG. 1 in an order of ①②③④ and write the corresponding display data SD into each pixel Pix.

In light of the foregoing, even though the flat display panel 100 illustrated in FIG. 1 reduces the number of data lines by half and consequently reduces the fabricating cost of the source driver, it is observed from the driving time chart disclosed in FIG. 2 that methods of the timing controller to control the gate driver and the source driver are complicated, and the timing controller must be additionally disposed with at least three line buffers that are different from those used when normally driving the panel (which is because the source driver includes three pixel rows by following the dashed arrows in FIG. 1 and travel in an order of ①②③④) so as to temporarily store the display data SD required by every three pixel rows respectively. Furthermore, in order to correspond to this driving method, a gate driver with complicated circuit structure must be fabricated on the Y-board, so that the overall fabricating price of the gate driver is dramatically increased.

SUMMARY OF THE INVENTION

Accordingly, a pixel array structure is provided in the present invention. Moreover, the pixel array structure thereof is an HSD structure and this flat display panel is driven by a gate driver which is directly disposed on a substrate of the flat display panel.

A flat display panel including a pixel array structure is provided in the present invention. The pixel array structure includes a plurality of scan lines, a plurality of data lines, and a plurality of pixels arranged in an array. In one exemplary embodiment of the present invention, the $i^{th}$ scan line is coupled to the $(4j+1)^{th}$ and $(4j+3)^{th}$ pixels of the $i^{th}$ pixel row, where i is an odd positive integer and j is an integer greater than or equal to 0. The $(i+1)^{th}$ scan line is coupled to the $(4j+2)^{th}$ and $(4j+4)^{th}$ pixels of the $i^{th}$ pixel row. The $(r+1)^{th}$ data line is coupled to the $(4k+1)^{th}$ and $(4k+2)^{th}$ pixels of the $(2r+1)^{th}$ pixel column, the $(4k+1)^{th}$ and $(4k+2)^{th}$ pixels of the $(2r+2)^{th}$ pixel columns and column, the $(4k+3)^{th}$ and $(4k+4)^{th}$ pixels of the $(2r+3)^{th}$ pixel column, and the $(4k+3)^{th}$ and (4k+4 pixels of $(2r+4)^{th}$ pixel column, where r and k are integers greater than or equal to 0.

A driving method of a flat display panel is further provided in the present invention. The flat display panel has a pixel array structure, and the driving method includes the following. In a first period within a frame period of the flat display panel, a first scan signal and a second scan signal are simultaneously provided to the $(4i+1)^{th}$ pixel row (where i is an integer greater than or equal to 0) so as to turn on all of the pixels of the $(4i+1)^{th}$ pixel row. Moreover, a plurality of first display data is provided correspondingly to be respectively written into all the pixels of the $(4i+1)^{th}$ pixel row. Next, in a second period within the aforementioned frame period, the second scan signal is provided to the $(4i+1)^{th}$ pixel row so as to turn on all of the even number pixels of the $(4i+1)^{th}$ pixel row and a plurality of second display data is provided correspondingly to be respectively written into all of the even number pixels of the $(4i+1)^{th}$ pixel row.

In light of the foregoing, the pixel array structure of the flat display panel provided in the present invention is the HSD structure. By skillfully arranging the coupled relationship between each pixel and each data line, the flat display panel provided in the present invention can be driven by the gate driver which is directly disposed on the substrate of the pixel array structure. Hence, not only is the overall fabricating cost of the gate driver reduced, but the manner of the timing controller controlling the gate driver and the source driver can also be reduced.

It should be understood that the general descriptions aforementioned and the following embodiments are merely exemplary and illustrative, and the scope of the present invention is not limited thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
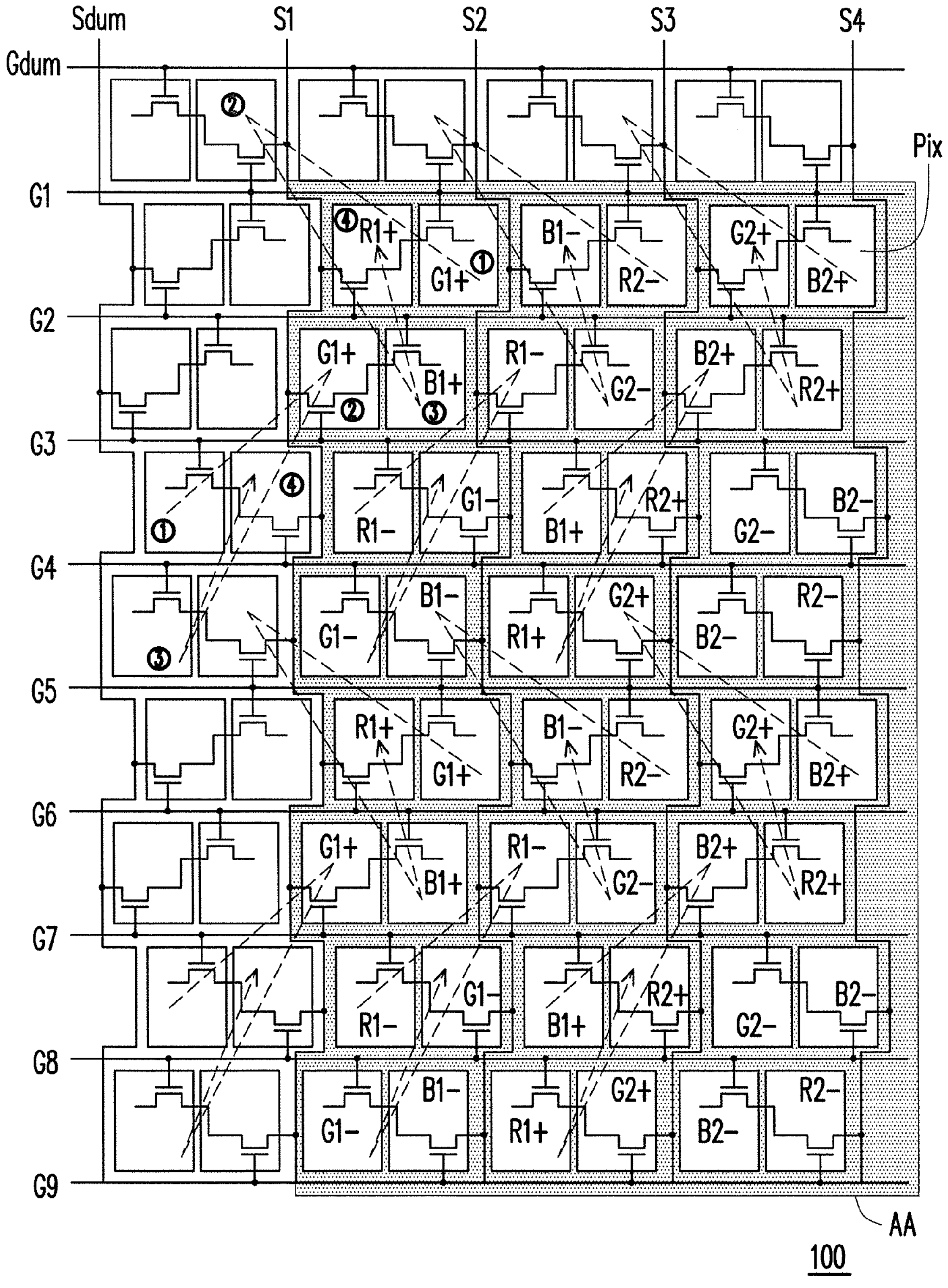
FIG. 1 (PRIOR ART)
FIG. 1 illustrates a partial schematic view of a flat display panel 100 of a conventional HSD structure.
Figure 2:
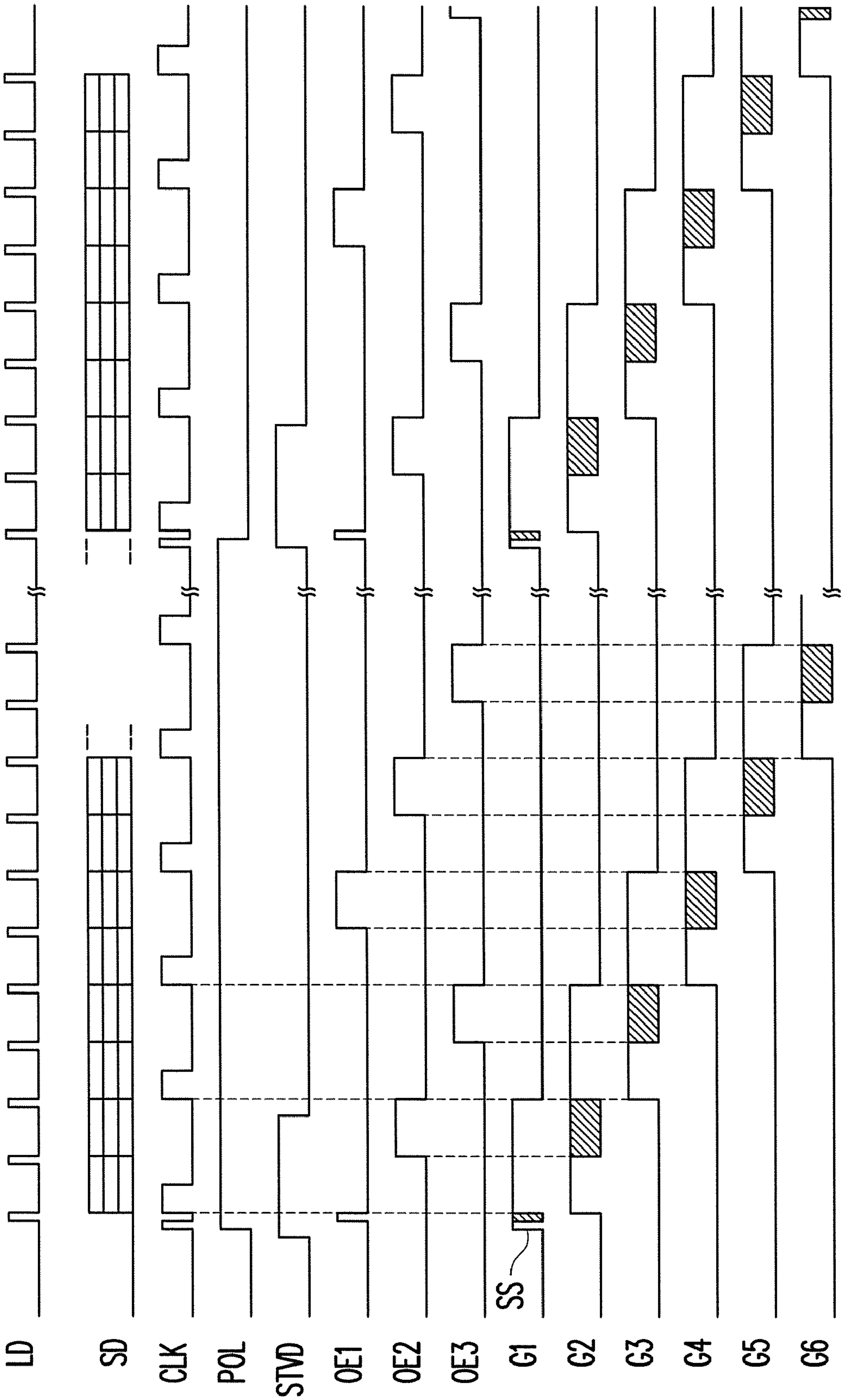
FIG. 2 (PRIOR ART)
FIG. 2 illustrates a partial driving time chart of the flat display panel 100 (which is shown in FIG. 1) applying a panel driving technique of a two line two dot inversion.

In the following, descriptions of the present invention are given with reference to the exemplary embodiments illustrated with accompanied drawings. Moreover, elements/components/notations with same reference numerals represent same or similar parts in the drawings and embodiments.

Figure 3:
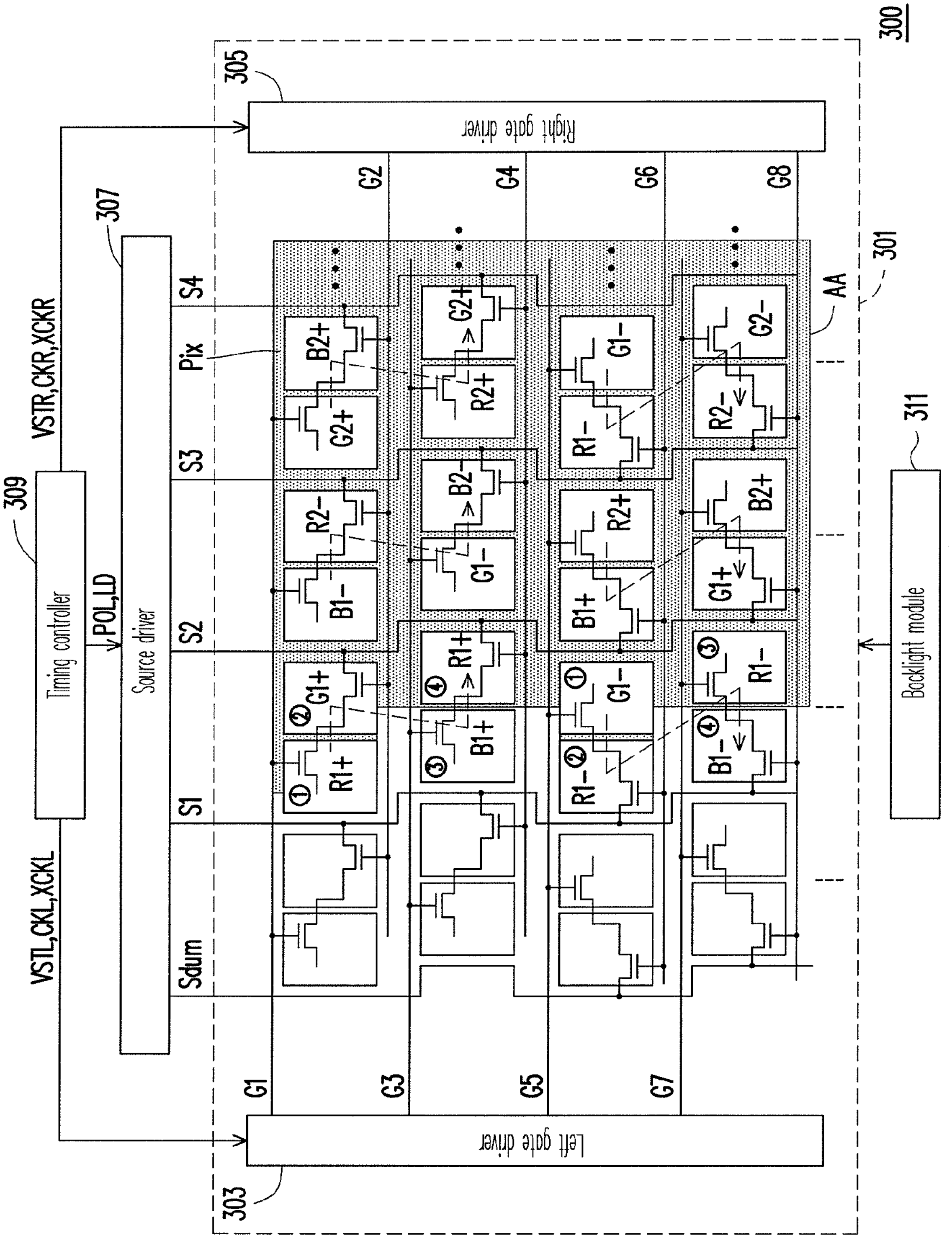
FIG. 3 is a block diagram illustrating a system of a flat display panel 300 according to an exemplary embodiment of the present invention.

FIG. 3 is a block diagram illustrating a system of a flat display panel 300 according to an exemplary embodiment of the present invention. The flat display panel includes, for example, a liquid crystal display panel (LCD panel), an organic light emitting display panel (OLED panel), a flexible display panel, a plasma display panel (PDP), or an electrophoresis display panel (EPD panel). Referring to FIG. 3, the flat display panel 300 includes a pixel array structure 301, a left gate driver 303, a right gate driver 305, a source driver 307, a timing controller 309, and a backlight module 311 configured to provide a backlight source required by the LCD panel 301. The backlight module 311 may be omitted, if the flat display panel is an OLED panel or a reflector LCD panel. The pixel array structure 301 includes a plurality of scan lines G1~G8 (only 8 scan lines are shown in FIG. 3; however, the present embodiment is not limited thereto), a dummy data line Sdum, a plurality of data lines S1~S4 (1 dummy data line Sdum and 4 data lines are shown in FIG. 3; however, the present embodiment is not limited thereto), and a plurality of pixels Pix arranged in an array (the present embodiment is not limited to the number of pixels shown in FIG. 3).

In the present exemplary embodiment, the scan line is coupled to the $(4j+1)^{th}$ and $(4j+3)^{th}$ pixels of the $i^{th}$ pixel row, where i is an odd positive integer and j is a positive integer greater than 0. The $(i+1)^{th}$ scan line is coupled to the $(4j+2)^{th}$ and $(4j+4)^{th}$ pixels of the $i^{th}$ pixel row. The $(r+1)^{th}$ data line is coupled to the $(4k+1)^{th}$ and $(4k+2)^{th}$ pixels of the $(2r+1)^{th}$ pixel column, the $(4k+1)^{th}$ and $(4k+2)^{th}$ pixels of the $(2r+2)^{th}$ pixel column, the $(4k+3)^{th}$ and $(4k+4)^{th}$ pixels of the $(2r+3)^{th}$ pixel column, and the $(4k+3)^{th}$ and $(4k+4)^{th}$ pixels of $(2r+4)^{th}$ pixel column, where r and k are integers greater than or equal to 0.

It should be noted that in the present exemplary embodiment, the number of all the scan lines in the pixel array structure 301 is an even number and the number of all the data lines in the pixel array structure 301 is an odd number. The dummy data line Sdum is coupled to the $(4k+3)^{th}$ and the $(4k+4)^{th}$ pixels of the $1^{st}$ and $2^{nd}$ columns of the plurality of pixels Pix arranged in the array in the LCD panel 301. Moreover, the $1^{st}$ and $2^{nd}$ columns of the plurality of pixels Pix arranged in the array in the pixel array structure 301 are not located within a display area AA of the pixel array structure 301. In other words, the pixels are deemed to be dummy pixels used for balancing loading or disposed for the consideration of arrangement repetition in the pixel array.

A pixel array structure 301 of the flat display panel 300 disclosed in FIG. 3 is an HSD structure; thus, the number of the scan lines is doubled and the number of data lines is halved. Since the number of the data lines is halved, a manufacturing cost of the source driver 307 is relatively reduced.

In addition, as the number of scan lines is doubled, a manufacturing cost is increased if the conventional method of fabricating the gate driver on a Y-board is applied. Accordingly, in the present exemplary embodiment, the left gate driver 303 and the right gate driver 305 are directly disposed on a substrate (such as a glass substrate) of the pixel array structure 301, and a method of both-side driving scan lines is used so as to reduce the overall fabricating cost of the gate driver effectively.

More specifically, the left gate driver 303 is directly disposed on one side (e.g. the left side) of the glass substrate of the pixel array structure 301 and coupled to odd scan lines of the plurality of scan lines G1~G8 within the pixel array structure 301 for providing a first scan signal sequentially to all of the odd scan lines of the plurality of scan lines G1~G8 within the pixel array structure 301. Here, an operation of the left gate driver 303 is controlled by control signals VSTL, CKL, XCKL that are provided by the timing controller 309.

Furthermore, the right gate driver 305 is directly disposed on the other side (e.g. the right side) of the glass substrate of the pixel array structure 301 and coupled to even scan lines of the plurality of scan lines G1~G8 within the pixel array structure 301 for providing a second scan signal sequentially to all of the even scan lines of the plurality of scan lines G1~G8 within the pixel array structure 301. An operation of the right gate driver 305 is controlled by control signals VSTR, CKR, XCKR that are provided by the timing controller 309. Obviously, the right gate driver 305 can also be directly disposed on the same side of the glass substrate as the left gate driver 303.

It should be emphasized that the left gate driver 303 and the right gate driver 305 on the glass substrate of the pixel array structure 301 are manufactured on the glass substrate simultaneously with the manufacturing of elements of the plurality of pixels Pix of the pixel array structure 301 with techniques such as thin film, photo, and etching.

The source driver 307 is coupled to the pixel array structure 301 and is at least controlled by control signals LD and POL provided by the timing controller 309 for providing corresponding display data SD to each of the data lines S1~S4. Consequently, each column of the plurality of pixels Pix within the pixel array structure 301 can receive the corresponding display data SD respectively via the corresponding data lines S1~S4.

Figure 4:
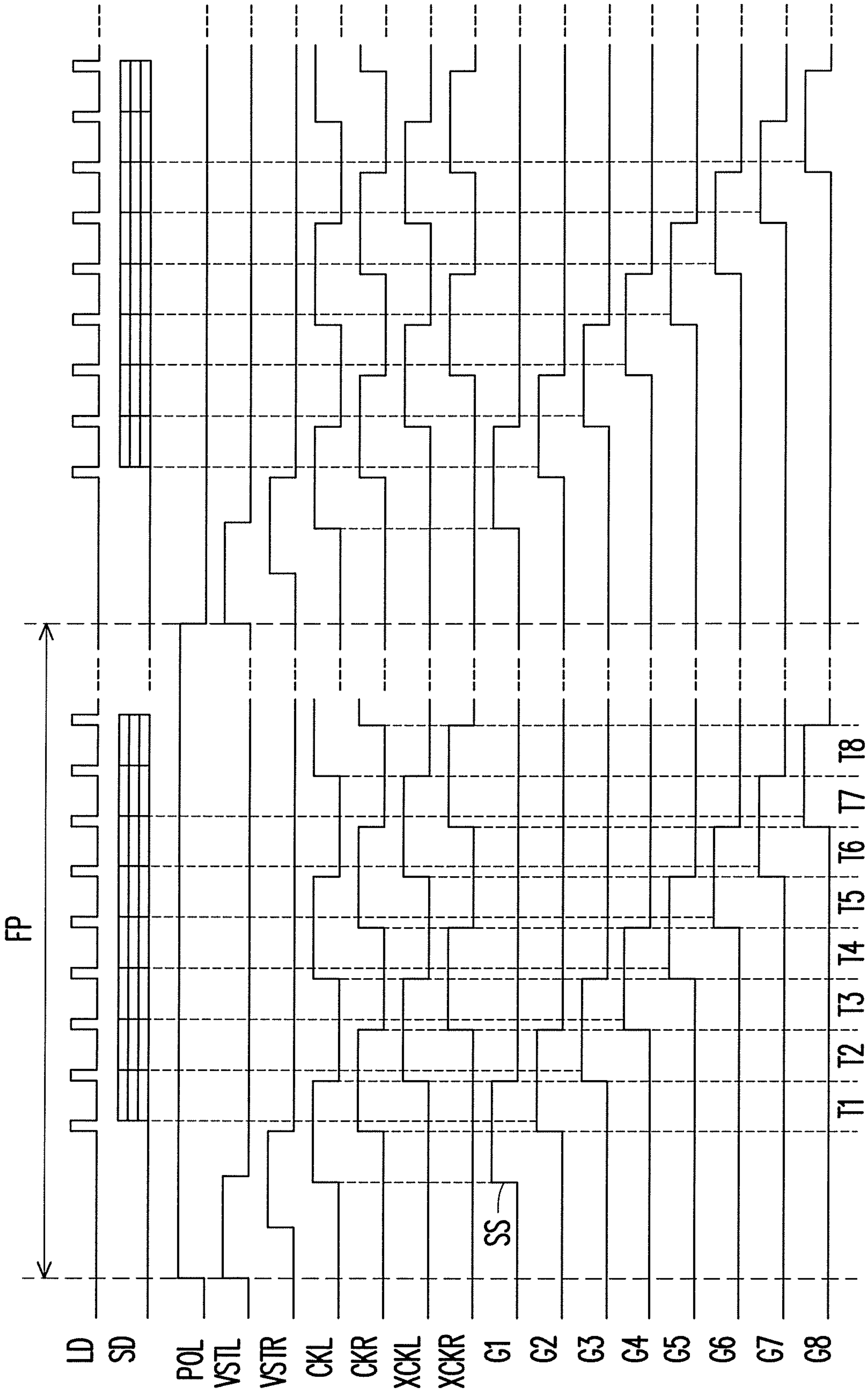
FIG. 4 illustrates a partial driving time chart of a pixel array structure 301 applying a panel driving technique of two line two dot inversion according to an exemplary embodiment of the present invention.

In order to illustrate the operation theory of the flat display panel 300, a partial driving time chart of the pixel array structure 301 applying a panel driving technique of a two line two dot inversion according to an exemplary embodiment of the present invention is shown in FIG. 4. Referring to FIG. 3 and FIG. 4 simultaneously, it is obvious from the driving time chart disclosed in FIG. 4 that the left gate driver 303 and the right gate driver 305 are respectively controlled by the control signals VSTL, CKL, XCKL and VTSR, CKR, XCKR that are provided by the timing controller 309, so as to cross-cooperate for providing a scan signal SS sequentially to corresponding the scan lines G1~G8 within in the LCD panel 301.

In addition, the source driver 307 is at least controlled by the control signals LD and POL provided by the timing controller 309 for providing the corresponding display data SD to each of the data lines S1~S4. As a consequence, the source driver 307 follows dashed arrow in FIG. 3 in an order of ① ② ③ ④ and writes the corresponding display data SD into each pixel Pix.

More clearly, in a first period T1 within a frame period FP of the flat display panel 300, the timing controller 309 controls the left and right gate drivers 303 and 305 to output the scan signals SS to the scan lines G1 and G2 (that is, the $1^{st}$ pixel row) simultaneously, so as to turn on the active devices (e.g. thin film transistor, TFT) in all of the pixels Pix in the $1^{st}$ pixel row. In addition, the timing controller 309 controls the source driver 307 for providing a plurality of corresponding first display data SD to be written respectively into all of the pixels Pix in the $1^{st}$ pixel row.

Next, in a second period T2 within the same frame period FP, the timing controller 309 controls the left and right gate drivers 303 and 305 to output the scan signals SS respectively to the scan lines G2 and G3 (that is, the $1^{st}$ and the $2^{nd}$ pixel rows) so as to turn on the active devices (TFT) in all of the even number pixels Pix of the $1^{st}$ pixel row and the active devices (TFT) in all of the odd number pixels Pix of the $2^{nd}$ pixel row. Furthermore, the timing controller 309 controls the source driver 307 for providing a plurality of corresponding second display data SD to be written respectively into all of the even number pixels Pix of the $1^{st}$ pixel row.

However, during the second period T2, the right gate driver 305 does not output the scan signal SS to the scan line G4 (that is, the $2^{nd}$ pixel row). Therefore, even if all of the odd pixels Pix of the $2^{nd}$ pixel row have been turned on during the second period T2, the second display data SD provided by the source driver 307 at this time are not written into all of the pixels Pix of the $2^{nd}$ pixel row.

Similarly, in a third period T3 within the same frame period FP, the timing controller 309 controls the left and right gate drivers 303 and 305 to output the scan signals SS to the scan lines G3 and G4 (that is, the $2^{nd}$ pixel row) simultaneously, so as to turn on the active devices (TFT) in all of the pixels Pix in the $2^{nd}$ pixel row. In addition, the timing controller 309 controls the source driver 307 for providing a plurality of corresponding third display data SD to be written respectively into all of the pixels Pix in the $2^{nd}$ pixel row.

Thereafter, in a fourth period T4 within the same frame period FP, the timing controller 309 controls the left and right gate drivers 303 and 305 to output the scan signals SS to the scan lines G4 and G5 (that is, the $2^{nd}$ and the $3^{rd}$ pixel rows) simultaneously, so as to turn on the active devices (TFT) in all of the even number pixels Pix in the $2^{nd}$ and the $3^{rd}$ pixel rows. In addition, the timing controller 309 controls the source driver 307 for providing a plurality of corresponding fourth display data SD to be written respectively into all of the even number pixels Pix in the $2^{nd}$ pixel row.

However, during the fourth period T4, the right gate driver 305 does not output the scan signal SS to the scan line G6 (that is, the $3^{rd}$ pixel row). Therefore, even if all of the even pixels Pix of the $3^{rd}$ pixel row have been turned on during the fourth period T4, the fourth display data SD provided by the source driver 307 at this time is not written into all of the pixels Pix of the $3^{rd}$ pixel row.

Similarly, in a fifth period T5 within the same frame period FP, the timing controller 309 controls the left and right gate drivers 303 and 305 to output the scan signals SS to the scan lines G5 and G6 (that is, the $3^{rd}$ pixel row) simultaneously, so as to turn on the active devices (TFT) in all of the pixels Pix in the $3^{rd}$ pixel row. In addition, the timing controller 309 controls the source driver 307 for providing a plurality of corresponding fifth display data SD to be written respectively into all of the pixels Pix in the $3^{rd}$ pixel row.

Next, in a sixth period T6 within the same frame period FP, the timing controller 309 controls the left and right gate drivers 303 and 305 to output the scan signals SS respectively to the scan lines G6 and G7 (that is, the $3^{rd}$ and the $4^{th}$ pixel rows) so as to turn on the active devices (TFT) in all of the odd number pixels Pix of the $3^{rd}$ pixel row and the active devices (TFT) in all of the even number pixels Pix of the $4^{th}$ pixel row. Furthermore, the timing controller 309 controls the source driver 307 for providing a plurality of corresponding sixth display data SD to be written respectively into all of the odd number pixels Pix of the $3^{rd}$ pixel row.

However, during the sixth period T6, the right gate driver 305 does not output the scan signal SS to the scan line G8 (that is, the $4^{th}$ pixel row). Therefore, even if all of the even pixels Pix of the $4^{th}$ pixel row have been turned on during the sixth period T6, the sixth display data SD provided by the source driver 307 at this time is not written into all of the pixels Pix of the $4^{th}$ pixel row.

Similarly, in a seventh period T7 within the same frame period FP, the timing controller 309 controls the left and right gate drivers 303 and 305 to output the scan signals SS to the scan lines G7 and G8 (that is, the $4^{th}$ pixel row) simultaneously, so as to turn on the active devices (TFT) in all of the pixels Pix in the $4^{th}$ pixel row. In addition, the timing controller 309 controls the source driver 307 for providing a plurality of corresponding seventh display data SD to be written respectively into all of the pixels Pix in the $4^{th}$ pixel row.

Afterwards, in a eighth period T8 within the same frame period FP, the timing controller 309 controls the left and right gate drivers 303 and 305 to output the scan signals SS respectively to the scan lines G8 and G9 (not shown; that is, the $4^{th}$ and the $5^{th}$ pixel rows) so as to turn on the active devices (TFT) in all of the odd number pixels Pix of the $4^{th}$ pixel row and the active devices (TFT) in all of the odd number pixels Pix of the $5^{th}$ pixel row. Furthermore, the timing controller 309 controls source driver 307 for providing a plurality of corresponding eighth display data SD to be written respectively into all of the odd number pixels Pix of the $4^{th}$ pixel row.

However, during the eighth period T8, the right gate driver 305 does not output the scan signal SS to the scan line G10 (not shown; that is, the $5^{th}$ pixel row). Therefore, even if all of the odd pixels Pix of the $5^{th}$ pixel row have been turned on during the eighth period T8, the eighth display data SD provided by the source driver 307 at this time is not written into all of the pixels Pix of the $5^{th}$ pixel row.

Similarly, after the eighth period T8 within the same frame period FP, the timing controller 309 uses the first to the eighth periods T1~T8 as a cycle to control the left and right gate drivers 303 and 305 and the source driver 307 so as to write the corresponding display data SD into every four pixel rows until the next frame period.

For example, in the ninth to sixteenth periods within the same frame period FP, the timing controller 309 controls the left and right gate driver 303 and 305 and the source driver 307 so as to write the corresponding display data SD into the $5^{th}$ to $8^{th}$ pixel rows. An order of writing the corresponding display data SD into the $5^{th}$ and $6^{th}$ pixel rows is similar to that of the $1^{st}$ and the $2^{nd}$ pixel rows. On the other hand, an order of writing the corresponding display data SD into the $7^{th}$ and $8^{th}$ pixel rows is similar to that of the $3^{rd}$ and $4^{th}$ pixel rows.

Furthermore, in the seventeenth to twenty-fourth periods within the same frame period FP, the timing controller 309 controls the left and right gate drivers 303 and 305 and the source driver 307, so as to write the corresponding display data SD into the $9^{th}$ to $12^{th}$ pixel rows. The rest of the procedure can be deduced from the descriptions described above and the details are not to be reiterated herein. In light of the foregoing, the pixel array structure of the pixel array structure 301 in the present exemplary embodiment is the HSD structure. By skillfully arranging the coupled relationship between each pixel and each data line, the pixel array structure 301 can be driven by the left and right gate drivers 303 and 305 which are disposed directly on the glass substrate of the LCD panel 301. Hence, not only is the overall fabricating cost of the left and right gate drivers 303 and 305 reduced, but the manner of the timing controller 309 controlling the left and right gate driver 303 and 305 and the source driver can also be reduced.

In addition, the timing controller 309 controls the left and right gate driver 303 and 305 and the source driver 307 so as to write the display data SD respectively into each pixel row. Therefore, the timing controller 309 of the present exemplary embodiment merely requires an additional disposition of a line buffer which is different from the ones used when normally driving the panel. Consequently, compared to the previous techniques, the cost of the timing controller 309 of the present exemplary embodiment is reduced effectively.

Moreover, as disclosed in the driving time chart in FIG. 4, the control signal POL configured to determine the driving polarity of each of the data lines S1~S4 is only inverted once every frame period FP of the flat display panel 300. In other word, the driving polarity of the display data SD received by each pixel column within the pixel array structure 301 is converted once every frame period FP of the flat display panel 300. Accordingly, the overall power consumption of the source driver 307 is reduced dramatically.

Based on the descriptions disclosed in the exemplary embodiments aforementioned, a method of driving a flat display panel 300 is integrated in the following.

Figure 5:
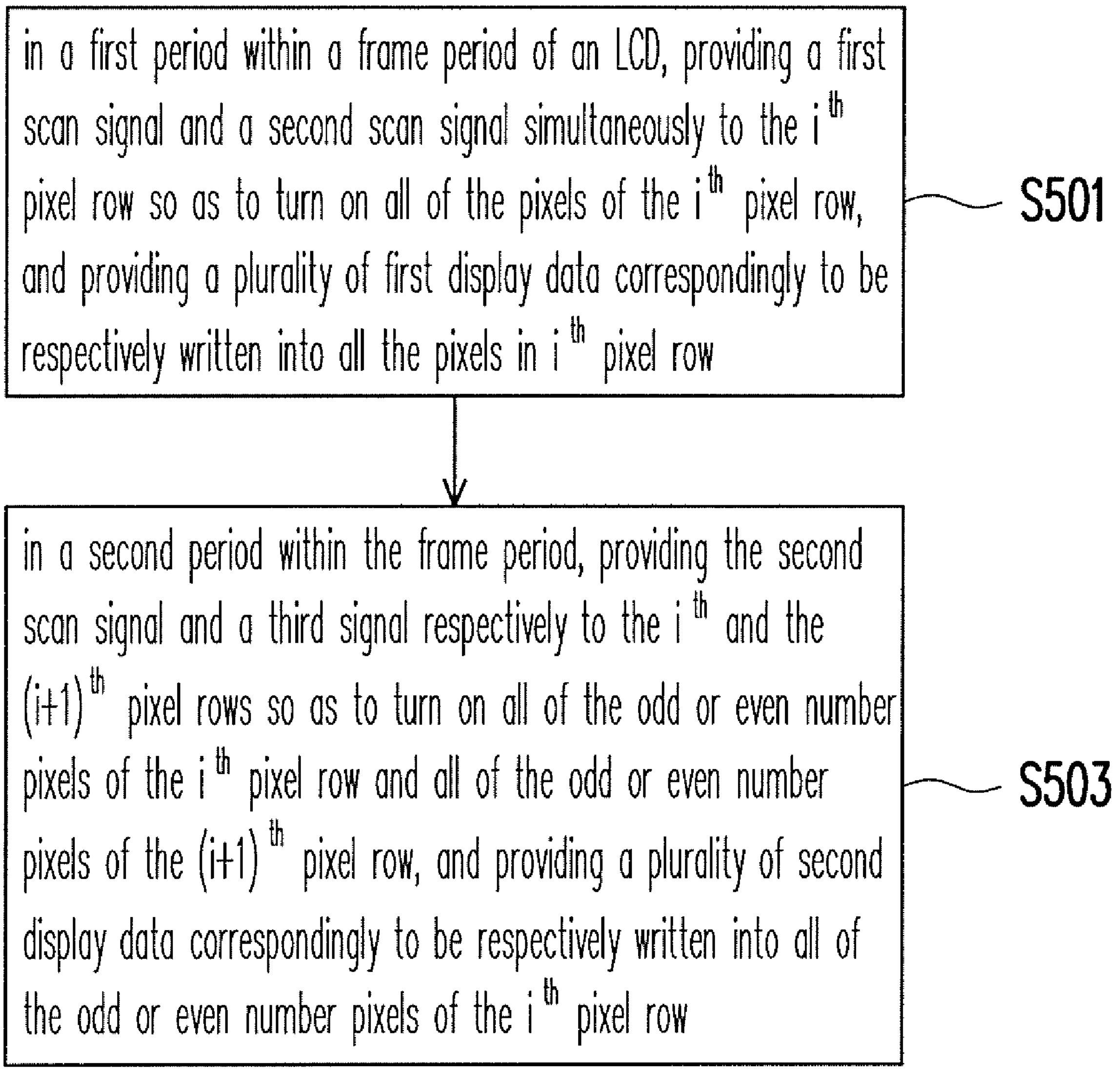
FIG. 5 is a flowchart illustrating a method of driving a flat display panel according to an exemplary embodiment of the present invention.

FIG. 5 is a flowchart illustrating a method of driving a flat display panel (for example, an LCD, but not limited thereto) including a pixel array structure according to an exemplary embodiment of the present invention. Referring to FIG. 5, a driving method of a flat display panel of the present exemplary embodiment is adapted for driving a flat display panel including pixel array structure, and the method includes the following steps. In a first period within a frame period of the flat display panel including a pixel array structure, a first scan signal and a second scan signal are simultaneously provided to the $i^{th}$ pixel row (where i is a positive integer) so as to turn on all of the pixels of the $i^{th}$ pixel row. Moreover, a plurality of first display data is provided correspondingly to be respectively written into all the pixels in $i^{th}$ pixel row (step S501). Next, in a second period within the aforementioned frame period, the second scan signal and a third scan signal are respectively provided to the $i^{th}$ and the $(i+1)^{th}$ pixel rows so as to turn on all of the odd or even number pixels of the $i^{th}$ pixel row and all of the odd or even number pixels of the $(i+1)^{th}$ pixel row, and a plurality of second display data is provided correspondingly to be respectively written into all of the odd or even number pixels of the $i^{th}$ pixel row (step S503).

In summary, the pixel array structure of the flat display panel provided in the present invention is the HSD structure. By skillfully arranging the coupled relationships between each pixel and each data line, the pixel array structure of the flat display panel provided in the present invention can be driven by the gate driver which is directly disposed on the substrate of the pixel array structure. Hence, not only is the overall fabricating cost of the gate driver reduced, but the manner of the timing controller controlling the gate driver and the source driver can also be reduced.

In the above embodiments, the flat display panel includes an LCD panel, but it's not limited the sort of the flat display panel, it could includes an OLED panel, a PDP panel, an electrophoresis display panel, a flexible display panel, etc. It can be practiced in the actual use by the person having ordinary skill in the art.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel array structure, comprising:

a plurality of scan lines;

a plurality of data lines;

a plurality of pixels, arranged in an array;

wherein an $i^{th}$ scan line is coupled to a $(4j+1)^{th}$ pixel and a $(4j+3)^{th}$ pixel of an $i^{th}$ pixel row, and i is an odd positive integer while j is an integer greater than or equal to 0;

an $(i+1)^{th}$ scan line is coupled to a $(4j+2)^{th}$ pixel and a $(4j+4)^{th}$ pixel of the $i^{th}$ pixel row; and an $(r+1)^{th}$ data line is coupled to a $(4k+1)^{th}$ pixel and a $(4k+2)^{th}$ pixel of a $(2r+1)^{th}$ pixel column, a $(4k+1)^{th}$ pixel and a $(4k+2)^{th}$ pixel of a $(2r+2)^{th}$ pixel column, a $(4k+3)^{th}$ pixel and a $(4k+4)^{th}$ pixel of a $(2r+3)^{th}$ pixel column, and a $(4k+3)^{th}$ pixel and a $(4k+4)^{th}$ pixel of a $(2r+4)^{th}$ pixel column, wherein r and k are integers greater than or equal to 0.

2. The pixel array structure as claimed in claim 1, wherein the number of the plurality of data lines is an odd number.

3. The pixel array structure as claimed in claim 2, wherein the pixel array structure further comprises:

a dummy data line, coupled to a $(4k+3)^{th}$ pixel and a $(4k+4)^{th}$ pixel of a $1^{st}$ column and a $2^{nd}$ column of the plurality of pixels, wherein the $1^{st}$ column and the $2^{nd}$ column of the plurality of pixels are not present in a display area of the pixel array structure.

4. The pixel array structure as claimed in claim 1, wherein a driving polarity of display data received by each column of the plurality of pixels within the pixel array structure is switched once at a frame period of a flat display panel.

5. A flat display panel comprising:

the pixel array structure as claimed in claim 1;

a first gate driver, disposed directly on one side of a substrate of the pixel array structure and coupled to odd scan lines of the plurality of scan lines; and a second gate driver, disposed directly on the substrate of the pixel array structure and coupled to even scan lines of the plurality of scan lines, wherein the first gate driver, the second gate driver and the plurality of pixels are fabricated on the substrate simultaneously.

6. The flat display panel as claimed in claim 5, wherein the second gate driver is correspondingly disposed on the same side as the first gate driver.

7. The flat display panel as claimed in claim 5, wherein each column of the plurality of pixels within the flat display panel receives a corresponding display data via the plurality of data lines respectively.

8. The flat display panel as claimed in claim 7, wherein a driving polarity of the display data received by each column of the plurality of pixels within the pixel array structure is switched once at a frame period of the flat display panel.

9. The flat display panel as claimed in claim 8, further comprising:

a source driver, coupled to the pixel array structure, for providing the display data to the plurality of data lines correspondingly; and a timing controller, coupled to the first gate driver, the second gate driver, and the source driver and controlling operations thereof.

10. The flat display panel as claimed in claim 9, further comprising:

a backlight module, configured to provide a backlight source.

11. The flat display panel as claimed in claim 5, wherein the flat display panel comprises a liquid crystal display panel, a plasma display panel, an organic light emitting diode panel, an electrophoresis panel, or a flexible display panel.

12. A method for driving the flat display panel as claimed in claim 5, the method comprising:

in a first period within a frame period of the flat display panel, providing a first scan signal and a second scan signal simultaneously to a $(4i+1)^{th}$ pixel row so as to turn on all of the pixels of the $(4i+1)^{th}$ pixel row, and correspondingly providing a plurality of first display data to be respectively written into the pixels of the $(4i+1)^{th}$ pixel row; and in a second period within the frame period, providing the second scan signal to the $(4i+1)^{th}$ pixel row so as to turn on all of the even number pixels of the $(4i+1)^{th}$ pixel row and correspondingly providing a plurality of second display data to be respectively written into all of the even number pixels of the $(4i+1)^{th}$ pixel row, wherein i is an integer greater than or equal to 0.

13. The method as claimed in claim 12, further comprising:

in the second period within the frame period, providing a third scan signal to an $(4i+2)^{th}$ pixel row so as to turn on all of the odd number pixels of the $(4i+2)^{th}$ pixel row.

14. The method as claimed in claim 13, further comprising:

in a third period within the frame period, providing the third scan signal and a fourth scan signal simultaneously to the $(4i+2)^{th}$ pixel row so as to turn on all of the pixels of the $(4i+2)^{th}$ pixel row, and correspondingly providing a plurality of third display data to be respectively written into the pixels of the $(4i+2)^{th}$ pixel row; and in a fourth period within the frame period, providing the fourth scan signal to the $(4i+2)^{th}$ pixel row so as to turn on all of the even number pixels of the $(4i+2)^{th}$ pixel row, and correspondingly providing a plurality of fourth display data to be respectively written into the even number pixels of the $(4i+2)^{th}$ pixel row.

15. The method as claimed in claim 14, further comprising:

in the fourth period within the frame period, providing a fifth scan signal to an $(4i+3)^{th}$ pixel row so as to turn on all of the even number pixels of the $(4i+3)^{th}$ pixel row.

16. The method as claimed in claim 15, further comprising:

in a fifth period within the frame period, providing the fifth scan signal and a sixth scan signal simultaneously to the $(4i+3)^{th}$ pixel row so as to turn on all of the pixels of the $(4i+3)^{th}$ pixel row, and correspondingly providing a plurality of fifth display data to be respectively written into the pixels of the $(4i+3)^{th}$ pixel row; and in a sixth period within the frame period, providing the sixth scan signal to the $(4i+3)^{th}$ pixel row so as to turn on all of the odd number pixels of the $(4i+3)^{th}$ pixel row, and correspondingly providing a plurality of sixth display data to be respectively written into the odd number pixels of the $(4i+3)^{th}$ pixel row.

17. The method as claimed in claim 16, further comprising:

in the sixth period within the frame period, further providing a seventh scan signal to an $(4i+4)^{th}$ pixel row so as to turn on all of the even number pixels of the $(4i+4)^{th}$ pixel row.

18. The method as claimed in claim 17, further comprising:

in a seventh period within the frame period, providing the seventh scan signal and an eighth scan signal simultaneously to the $(4i+4)^{th}$ pixel row so as to turn on all of the pixels of the $(4i+4)^{th}$ pixel row, and correspondingly providing a plurality of seventh display data to be respectively written into the pixels of the $(4i+4)^{th}$ pixel row; and in an eighth period within the frame period, providing the eighth scan signal to the $(4i+4)^{th}$ pixel row so as to turn on all of the odd number pixels of the $(4i+4)^{th}$ pixel row, and correspondingly providing a plurality of eighth display data to be respectively written into the odd number pixels of the $(4i+4)^{th}$ pixel row.

19. The method as claimed in claim 18, wherein a driving polarity of the display data received by each column of the plurality of pixels is switched once at the frame period.

* * * * *